United States Patent
Wogari et al.

(10) Patent No.: US 7,190,130 B2
(45) Date of Patent: Mar. 13, 2007

(54) ELECTRIC MOTOR POLE POSITION SENSING METHOD, POLE POSITION SENSING APPARATUS, AND ELECTRIC MOTOR CONTROL APPARATUS USING THE SAME

(75) Inventors: Mengesha Mamo Wogari, Fukuoka (JP); Kozo Ide, Fukuoka (JP); Mitujiro Sawamura, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 10/486,131

(22) PCT Filed: Aug. 5, 2002

(86) PCT No.: PCT/JP02/07979

§ 371 (c)(1), (2), (4) Date: Feb. 6, 2004

(87) PCT Pub. No.: WO03/015256

PCT Pub. Date: Feb. 20, 2003

(65) Prior Publication Data

US 2004/0232862 A1 Nov. 25, 2004

(30) Foreign Application Priority Data

Aug. 6, 2001 (JP) .............................. 2001-238060

(51) Int. Cl.
*H02K 21/00* (2006.01)
*H02P 3/08* (2006.01)

(52) U.S. Cl. ....................... 318/254; 318/138; 318/439; 318/493; 318/494; 318/700; 318/720; 318/724

(58) Field of Classification Search ................ 318/138, 318/254, 439, 700, 493, 494, 720–724, 800–823
See application file for complete search history.

(56) References Cited

U.S. PATENT DOCUMENTS 5,194,794 A * 3/1993 Shamoto ..................... 318/603

(Continued)

FOREIGN PATENT DOCUMENTS

JP 2002-171798 A 6/2002

(Continued)

OTHER PUBLICATIONS

Adaptive Current Control Method for Brushless DC motor with Function of Parameter Identification IEEEJ Transactions on Industry Application, vol. 108 No. 12, 1988.

(Continued)

*Primary Examiner*—Lincoln Donovan
*Assistant Examiner*—Tyrone Smith
(74) *Attorney, Agent, or Firm*—Sughrue Mion, PLLC

(57) ABSTRACT

It is an object of the invention to provide a method which can detect a magnetic pole position easily and surely by using high-frequency currents such as harmonics of an inverter output and carrier frequency components. The invention provides a method of detecting a magnetic pole position of a motor and an apparatus for detecting a magnetic pole position in which, although high-frequency currents of carrier frequency components or the like are used, a special current detecting circuit is not required, and synchronization between the current detection timing and the position calculation can be easily attained, and also to provide an apparatus for controlling a motor using the same.

19 Claims, 4 Drawing Sheets

U.S. PATENT DOCUMENTS

| | | | | |
|---|---|---|---|---|
| 5,463,299 | A * | 10/1995 | Futami et al. | 318/618 |
| 5,483,141 | A * | 1/1996 | Uesugi | 318/811 |
| 5,929,400 | A * | 7/1999 | Colby et al. | 187/393 |
| 6,140,789 | A * | 10/2000 | Kachi et al. | 318/603 |
| 6,232,737 | B1 * | 5/2001 | Kachi et al. | 318/610 |
| 6,462,492 | B1 * | 10/2002 | Sakamoto et al. | 318/254 |
| 6,489,692 | B1 * | 12/2002 | Gilbreth et al. | 290/52 |
| 6,512,341 | B2 * | 1/2003 | Matsushiro et al. | 318/254 |
| 6,555,988 | B2 * | 4/2003 | Masaki et al. | 318/721 |
| 6,608,456 | B2 * | 8/2003 | Imai et al. | 318/254 |
| 6,636,012 | B2 * | 10/2003 | Royak et al. | 318/727 |
| 6,667,598 | B2 * | 12/2003 | Shimohara | 318/811 |
| 6,707,265 | B2 * | 3/2004 | Imai et al. | 318/254 |
| 6,771,039 | B2 * | 8/2004 | Sakurai et al. | 318/722 |
| 6,788,024 | B2 * | 9/2004 | Kaneko et al. | 318/807 |
| 6,801,011 | B2 * | 10/2004 | Ide | 318/700 |
| 6,812,659 | B2 * | 11/2004 | Imai et al. | 318/254 |
| 6,812,660 | B2 * | 11/2004 | Takahashi et al. | 318/254 |
| 6,869,272 | B2 * | 3/2005 | Odachi et al. | 417/44.1 |

FOREIGN PATENT DOCUMENTS

| | | | |
|---|---|---|---|
| JP | 2002-320398 A | | 10/2002 |
| JP | 2004-96856 | * | 3/2004 |
| WO | WO2004/021556 | * | 8/2004 |

OTHER PUBLICATIONS

"Zero Speed Torque Control of Sensorless Salient-Pole Synchronous Motor" 1996 National Convention of IEEJ Industry Applications Society No. 170.

"Position Sensorless IPM Motor Drive System Using Position Estimation Method Based on Saliency" IEEJ Transactions on Industry Applications, vol. 118 No. 5, 1998.

"Carrier Frequency Component Method for Position Sensorless Control of IPM Motor in Lower Speed Range" IEEJ Transitions on Industry Applications, vol. 120 No. 2000.

* cited by examiner

ELECTRIC MOTOR POLE POSITION SENSING METHOD, POLE POSITION SENSING APPARATUS, AND ELECTRIC MOTOR CONTROL APPARATUS USING THE SAME

CROSS-REFERENCE TO RELATED APPLICATIONS

This application is based on a Japanese patent application (JP-A-2001-238060) filed Aug. 6, 2001, and the contents of the patent application are incorporated herein by reference.

1. Field of the Invention

The present invention relates to an apparatus for controlling a motor which accurately estimates a magnetic pole position at a very low speed including zero speed, and which controls the torque and the speed on the basis of the estimated magnetic pole position.

2. Description of the Related Art

As a conventional method of estimating a magnetic pole position, widely used is a method in which an induced voltage that is proportional to a motor speed is calculated from a motor input voltage and a current, such as that reported in "Adaptive Current Control Method for Brushless DC motor with Function of Parameter Identification" IEEJ Transactions on Industry Applications, Vol. 108 No. 12, 1988. Also known is "Zero Speed Torque Control of Sensorless Salient-Pole Synchronous Motor" 1996 National Convention of IEEJ Industry Applications Society No. 170. In this technique, an AC signal is superimposed on a voltage command value, and a detected current is FFT analyzed to detect the rotational speed of a motor and a magnetic pole position. However, a method, which estimates the speed and position of a rotor on the basis of an induced voltage of a motor, operates with sufficient accuracy in a high speed region, but cannot perform correct estimation at a very low speed from which little information of the induced voltage is obtained.

Therefore, several methods have been proposed in which an AC signal that has no relation to a driving frequency, and that is used for sensing is injected into a motor, and a rotor position is estimated from relationships between the voltage and the current. However, a special signal generator is necessary in order to inject such a sensing signal, thereby causing a problem in that the control is complicated. Other methods in which a special sensing signal is not injected and a magnetic pole position is detected by using harmonics of an inverter output or currents of carrier frequency components are reported in "Position Sensorless IPM Motor Drive System Using Position Estimation Method Based on Saliency" IEEJ Transactions on Industry Applications, Vol. 118 No. 5, 1998, and "Carrier Frequency Component Method for Position Sensorless Control of IPM Motor in Lower Speed Range" IEEJ Transactions on Industry Applications, Vol. 120 No. 2, 2000.

The former method is characterized in that an inductance is calculated from high-frequency currents generated by output voltage harmonics of a PWM inverter, and the position is detected on the basis of the inductance. The latter method is characterized in that a phase difference of 120 deg. is produced between PWM inverter carrier signals of two of three or U-, V-, and W-phases to generate voltages and currents of carrier frequency components other than the driving frequency, and the position is detected by using only the carrier frequency component currents based on the assumption that a voltage during the carrier period is constant.

The methods which detect a magnetic pole position by using harmonics of an inverter output or high-frequency currents of carrier frequency components have an advantage that a special sensing signal generator is not necessary. However, the methods require plural current detections during the carrier period. Therefore, a special current detecting circuit is required, and synchronization between the current detection timing and the position calculation is complicated. Consequently, it is difficult to practically use such methods.

SUMMARY OF THE INVENTION

It is an object of the invention to provide a method of detecting a magnetic pole position of a motor and an apparatus for detecting a magnetic pole position in which, although high-frequency currents of carrier frequency components or the like are used, a special current detecting circuit is not required, and synchronization between the current detection timing and the position calculation can be easily attained, and also to provide an apparatus for controlling a motor using the same.

In order to attain the object, the first aspect of the invention provides a method of detecting a magnetic pole position of a motor having electric saliency wherein an arbitrary high frequency other than an output frequency of a voltage source PWM inverter is generated in input voltages or currents of a motor by means for producing an arbitrary phase difference between respective two phases such as UV, VW, or WU in the inverter, the voltages or currents are converted to a two-phase stationary coordinate system in which U-phase of three phases of the motor is $\alpha$-axis and an axis intersecting the axis at 90 deg. is $\beta$-axis, a current of the arbitrary high-frequency component is detected in each of the $\alpha$- and $\beta$-axes, the voltages or currents are converted to a two-phase stationary coordinate system in which a phase is similarly shifted by 45 deg. from the two-phase stationary coordinate system, or in which an axis that is shifted by 45 deg. from the $\alpha$-axis is $\alpha'$-axis and an axis intersecting the axis at 90 deg. is $\beta'$-axis, a current of the arbitrary high-frequency component is detected in each of the $\alpha'$- and $\beta'$-axes, and a magnetic pole position of the motor is detected by using the high-frequency current components that are detected respectively in the four axes.

The second aspect of the invention is characterized in that, in the method of detecting a magnetic pole position of a motor according to the first aspect, the magnetic pole position of the motor is detected by using an output which is obtained by extracting peak currents from the high-frequency current components that are detected respectively in the four axes, and then passing the peak currents through a low-pass filter.

The third aspect of the invention provides an apparatus for detecting a magnetic pole position for a controlling apparatus for driving a motor by a voltage source PWM inverter wherein the apparatus comprises: means for producing an arbitrary phase difference in PWM carrier signals between respective two phases such as UV, VW, or WU of three or U-, V-, and W-phases; means for extracting high-frequency voltages and high-frequency currents that are generated by it, from detected voltages or a command voltage and detected currents; and means for detecting a magnetic pole position by using the extracted high-frequency voltages and currents.

The fourth aspect of the invention provides an apparatus for detecting a magnetic pole position for a controlling apparatus for driving a motor by a voltage source PWM inverter wherein the apparatus comprises: means for producing an arbitrary phase difference in PWM carrier signals between respective two phases such as UV, VW, or WU of three or U-, V-, and W-phases; means for extracting only high-frequency currents that are generated by it; and means for detecting a magnetic pole position by using the extracted high-frequency currents.

The fifth aspect of the invention is characterized in that, in the apparatus for detecting a magnetic pole position of a motor according to the fourth aspect, the method of detecting a magnetic pole position according to the first aspect is used as the means for detecting a magnetic pole position.

The sixth aspect of the invention is characterized in that, in the apparatus for detecting a magnetic pole position of a motor according to the fourth aspect, the method of detecting a magnetic pole position according to the second aspect is used as the means for detecting a magnetic pole position.

The seventh aspect of the invention is characterized in that the arbitrary phase difference is 120 deg., and the arbitrary high frequency is an inverter carrier frequency.

The eighth aspect of the invention is characterized in that the arbitrary phase difference is 120 deg., and the arbitrary high frequency is an inverter carrier frequency.

The ninth aspect of the invention is characterized in that the arbitrary phase difference is 120 deg., and the arbitrary high frequency is an inverter carrier frequency.

The tenth aspect of the invention is characterized in that an apparatus comprises a current controlling apparatus which splits a detected current into a pole direction component and a torque component by using the position detected by the apparatus for detecting a magnetic pole position according to any one of the third and the fourth aspects, which feedbacks the components to compare the components with current command values for the pole direction component and the torque component, and which implements a current control so that deviations in the comparisons become zero.

The eleventh aspect of the invention is characterized in that the apparatus comprises a speed detecting apparatus which detects a speed by using the position detected by the apparatus for detecting a magnetic pole position according to any one of the third and the fourth aspects.

The twelfth aspect of the invention is characterized in that the apparatus comprises a speed controlling apparatus which compares the speed detected on the basis of the speed detecting apparatus of the apparatus for controlling a motor according to the eleventh aspect, with a command speed, which implements a speed control so that a deviation in the comparison becomes zero, and which outputs a torque command value or a current command value corresponding to a torque command.

The thirteenth aspect of the invention is characterized in that the apparatus comprises a position controlling apparatus which compares the magnetic pole position detected on the basis of the apparatus for detecting a magnetic pole position according to any one of the third and the fourth aspects, with a command position, which implements a position control so that a deviation in the comparison becomes zero, and which outputs a speed command value.

The fourteenth aspect of the invention is characterized in that the apparatus comprises a torque controlling apparatus having: the apparatus for detecting a magnetic pole position according to the ninth aspect; and the current controlling apparatus according to the tenth aspect.

The fifteenth aspect of the invention is characterized in that the apparatus comprises a speed controlling apparatus having: the apparatus for detecting a magnetic pole position according to the ninth aspect; the current controlling apparatus according to the tenth aspect; the speed detecting apparatus according to the eleventh aspect, and the speed controlling apparatus according to the twelfth aspect.

The sixteenth aspect of the invention is characterized in that the apparatus comprises a position controlling apparatus having: the apparatus for detecting a magnetic pole position according to the ninth aspect; the current controlling apparatus according to the tenth aspect; the speed detecting apparatus according to the eleventh aspect, the speed controlling apparatus according to the twelfth aspect; and the position controlling apparatus according to the thirteenth aspect.

DETAILED DESCRIPTION OF THE INVENTION

Figure 1A:
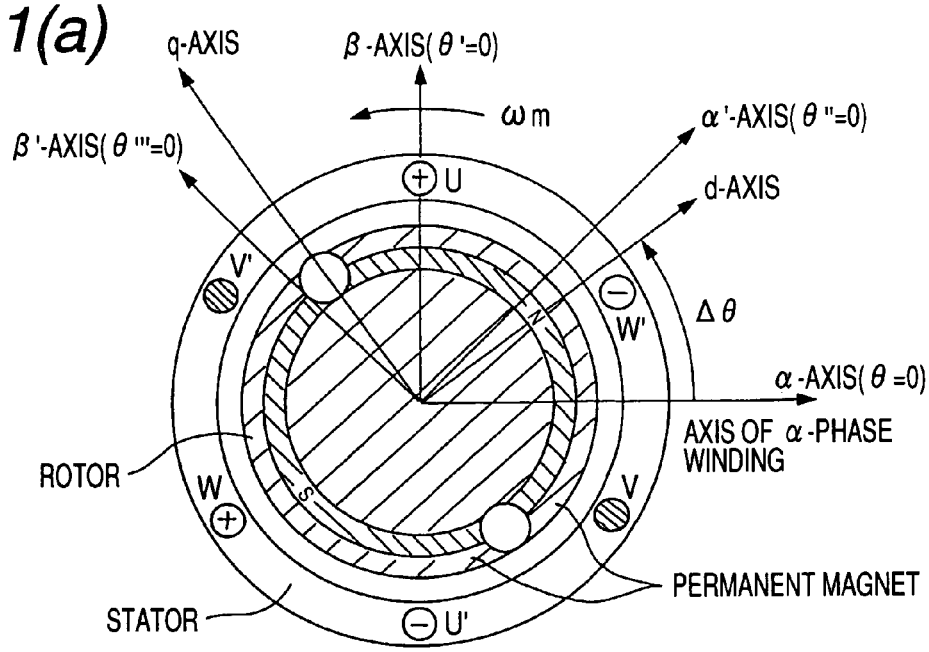
FIGS. 1(a) to 1(c) show the illustration views of the principle of the method of detecting a magnetic pole position of a motor according to the invention.

First, the invention is based on a method of detecting a magnetic pole position by using a current of a carrier frequency component, and the basic principle of the magnetic pole position detection will be described. In a vector controlling apparatus for a synchronous motor which is driven by a voltage source PWM inverter, an arbitrary phase difference is produced between PWM carrier signals of respective two phases such as UV, VW, or WU of three or U-, V-, and W-phases, thereby generating high-frequency voltages and high-frequency currents that are different from a driving frequency. Namely, the frequency band of generated high-frequency components can be adjusted to a frequency different from the driving frequency by arbitrarily giving the frequencies of the PWM carriers and the phase difference of the carriers. When the phase difference is 120 deg., for example, voltage and current components the frequencies of which are equal to the carrier frequency largely appear. In this case, the high-frequency voltages can be expressed by the following expression:

$$\begin{bmatrix} u_{uh} \\ u_{vh} \\ u_{wh} \end{bmatrix} = \begin{bmatrix} V\sin(\omega_h t) \\ V\sin(\omega_h t - 2\pi/3) \\ V\sin(\omega_h t + 2\pi/3) \end{bmatrix}$$

where uuh, uvh, and uwh indicate high-frequency voltages of the U-, V-, and W-phases, respectively, V indicates the amplitude of a high-frequency voltage, and $\omega_h$ indicates a carrier angular frequency.

Furthermore, relationships between the high-frequency voltages and the high-frequency currents are expressed by following expression (1):

$$\begin{bmatrix} u_{uh} \\ u_{vh} \\ u_{wh} \end{bmatrix} = \begin{bmatrix} L_{uu} & L_{uv} & L_{vw} \\ L_{vu} & L_{vv} & L_{vw} \\ L_{wu} & L_{wv} & L_{ww} \end{bmatrix} \frac{d}{dt} \begin{bmatrix} i_{uh} \\ i_{vh} \\ i_{wh} \end{bmatrix} \quad (1)$$

where iuh, ivh, and iwh indicate high-frequency currents of the U-, V-, and W-phases, respectively, L indicates an inductance, Luu, Lvv, and Lww indicate self inductances of the U-, V-, and W-phases, respectively, and the others indicate phase-to-phase inductances. A motor in which a permanent magnet is used in a rotor has electric salient poles (this means that the d-axis inductance and the q-axis inductance are different from each other). Therefore, the inductances contain information of a magnetic pole position.

$$L_{uv} = -L_{g0}/2 + L_{g2}\cos(2\theta - 2\pi/3)$$

$$L_{vw} = -L_{g0}/2 + L_{g2}\cos(2\theta)$$

$$L_{uw} = -L_{g0}/2 + L_{g2}\cos(2\theta + 2\pi/3)$$

$$L_{uu} = L_s + L_{g0} + L_{g2}\cos(2\theta)$$

$$L_{vv} = L_s + L_{g0} + L_{g2}\cos(2\theta + 2\pi/3)$$

$$L_{ww} = L_s + L_{g0} + L_{g2}\cos(2\theta - 2\pi/3)$$

where Lg0 indicates the magnetizing inductance in the air gap flux, Ls indicates the leakage inductance of a stator, and Lg2 indicates an inductance the degree of which depends on the angle.

When expression (1) is converted to a stator-based stationary coordinate system, following expression (2) is obtained:

$$\begin{bmatrix} u_{\alpha h} \\ u_{\beta h} \end{bmatrix} = \begin{bmatrix} L_0 + L_1\cos(2\theta) & L_1\sin(2\theta) \\ L_1\sin(2\theta) & L_0 - L_1\cos(2\theta) \end{bmatrix} \frac{d}{dt} \begin{bmatrix} i_{\alpha h} \\ i_{\beta h} \end{bmatrix} \quad (2)$$

where L0=Ls+3Lg0/2, and L1=3Lg2/2.

From expression (2), magnetic pole position information sin (2θ) and cos (2θ) are derived:

$$\begin{bmatrix} \cos(2\theta) \\ \sin(2\theta) \end{bmatrix} = \frac{1}{L_1\left[\left(\frac{d}{dt}i_{\alpha h}\right)^2 + \left(\frac{d}{dt}i_{\beta h}\right)^2\right]} \times \quad (3)$$

$$\begin{bmatrix} u_{\alpha h}\frac{d}{dt}i_{\alpha h} - u_{\beta h}\frac{d}{dt}i_{\beta h} - L_0\left\{\left(\frac{d}{dt}i_{\alpha h}\right)^2 - \left(\frac{d}{dt}i_{\beta h}\right)^2\right\} \\ u_{\alpha h}\frac{d}{dt}i_{\beta h} + u_{\beta h}\frac{d}{dt}i_{\alpha h} - 2L_0\left(\frac{d}{dt}i_{\alpha h}\frac{d}{dt}i_{\beta h}\right) \end{bmatrix}$$

In this way, the magnetic pole position can be estimated by using the high-frequency voltages and the high-frequency currents.

When the estimation mechanism is synchronized with the carrier frequency and the current is sampled at a point where a high-frequency current $i\beta_h$ reaches a peak, $i\alpha_h$ which is separated in phase by 90 deg. is substantially zero. Therefore, expression (3) can be expressed in a simpler manner as following expression (4):

$$\begin{bmatrix} \cos(2\theta) \\ \sin(2\theta) \end{bmatrix} = \quad (4)$$

$$\frac{1}{L_1\left(\frac{d}{dt}i_{\beta h}\right)^2} \begin{bmatrix} -u_{\beta h}\frac{d}{dt}i_{\beta h} + L_0\left(\frac{d}{dt}i_{\beta h}\right)^2 \\ u_{\alpha h}\frac{d}{dt}i_{\beta h} \end{bmatrix} = \begin{bmatrix} \frac{-u_{\beta h}}{\left(L_1\frac{d}{dt}i_{\beta h}\right)} + L_0 \\ \frac{u_{\alpha h}}{\left(L_1\frac{d}{dt}i_{\beta h}\right)} \end{bmatrix}$$

From expressions (3) and (4) above, cos (2θ) and sin (2θ) are obtained, the value of the angle 2θ is obtained on the basis of the information values from a table of trigonometric functions which is previously prepared in a calculator, and the value is divided by 2, whereby the magnetic pole position θ (hereinafter) can be detected. In the calculations of expressions (3) and (4), current differentiation values are used. At a high speed, the currents are rapidly changed, and hence the magnetic pole position is vibratory. From expression (2), therefore, current differentiation values are obtained as shown in expression (5). When both sides are integrated, expression (6) is obtained.

$$\frac{d}{dt}\begin{bmatrix} i_{\alpha h} \\ i_{\beta h} \end{bmatrix} = \frac{1}{L_0^2 - L_1^2}\begin{bmatrix} L_0 - L_1\cos(2\theta) & -L_1\sin(2\theta) \\ -L_1\sin(2\theta) & L_0 + L_1\cos(2\theta) \end{bmatrix}\begin{bmatrix} u_{\alpha h} \\ u_{\beta h} \end{bmatrix} \quad (5)$$

$$\begin{bmatrix} i_{\alpha h} \\ i_{\beta h} \end{bmatrix} = \frac{1}{L_0^2 - L_1^2}\begin{bmatrix} L_0 - L_1\cos(2\theta) & -L_1\sin(2\theta) \\ -L_1\sin(2\theta) & L_0 + L_1\cos(2\theta) \end{bmatrix}\begin{bmatrix} \int u_{\alpha h}dt \\ \int u_{\beta h}dt \end{bmatrix} \quad (6)$$

From expression (6), the magnetic pole position information sin (2θ) and cos (2θ) are derived:

$$\begin{bmatrix} \cos(2\theta) \\ \sin(2\theta) \end{bmatrix} = \frac{1}{L_1\{(\int u_{\alpha h}dt)^2 + (\int u_{\beta h}dt)^2\}} \times \quad (7)$$

$$\begin{bmatrix} L_0\{(\int u_{\alpha h}dt)^2 - (\int u_{\beta h}dt)^2\} - \\ (L_0^2 - L_1^2)(i_{\alpha h}\int u_{\alpha h}dt - i_{\beta h}\int u_{\beta h}dt) \\ 2L_0\int u_{\alpha h}dt \int u_{\beta h}dt - (L_0^2 - L_1^2)(i_{\alpha h}\int u_{\beta h}dt + i_{\beta h}\int u_{\alpha h}dt) \end{bmatrix}$$

In the case where the carrier period is synchronized with the voltage sampling period, the voltage integration value is dealt as a fixed value as in the following expression. In an inverter of a usual control voltage source, the voltage integration value is a fixed value during the carrier period.

$$\int u_{\alpha h}dt = u_{\alpha h}\Delta t, \quad \int u_{\beta h}dt = u_{\beta h}\Delta t$$

Δt: sampling time

When uαh is a peak voltage, uβh=0. At this timing, therefore, cos (2θ) is calculated from expression (7) as follow:

$$\cos(2\theta) = \frac{L_0}{L_1} - \frac{(L_0^2 - L_1^2)}{L_1} \cdot \frac{i_{\alpha h}|_{\theta=0°}}{u_{\alpha h}|_{\theta=0°} \cdot \Delta t}$$

When $u\beta h$ is a peak voltage, $u\alpha h=0$. At this timing, therefore, $\cos(2\theta)$ is calculated from expression (7) as follow:

$$\cos(2\theta) = -\frac{L_0}{L_1} + \frac{(L_0^2 - L_1^2)}{L_1} \cdot \frac{i_{\beta h}|_{\theta=90°}}{u_{\beta h}|_{\theta=90°} \cdot \Delta t} \quad (8)$$

At the point where $\theta$ is advanced by 45 deg. from the point of $u\alpha h=0$, $u\alpha h=u\beta h$. At this timing, therefore, $\sin(2\theta)$ is calculated from expression (7) as follow:

$$\sin(2\theta) = \frac{L_0}{L_1} - \frac{(L_0^2 - L_1^2)}{L_1} \cdot \frac{(i_{\alpha h} + i_{\beta h})|_{\theta=45°}}{(u_{\alpha h} + u_{\beta h})|_{\theta=45°} \cdot \Delta t} \quad (9)$$

At the point where $\theta$ is advanced by 135 deg. from the point of $u\alpha h=0$, $u\alpha h=-u\beta h$. At this timing, therefore, $\sin(2\theta)$ is calculated from expression (7) as follow:

$$\sin(2\theta) = -\frac{L_0}{L_1} + \frac{(L_0^2 - L_0^2)}{L_1} \cdot \frac{(i_{\alpha h} - i_{\beta h})|_{\theta=135°}}{(u_{\alpha h} + u_{\beta h})|_{\theta=135°} \cdot \Delta t} \quad (10)$$

As a result, it is possible to detect the position of the magnetic pole. In order to realize this method of detecting a magnetic pole position, however, the high-frequency currents at the timings of $u\alpha h=0$ and $u\alpha h=u\beta h$ must be correctly detected, and hence this technique is hardly performed in a practical use. In the invention, therefore, the following modification is applied to solve the problem.

FIG. 1 shows the principle of the detection of a magnetic pole position according to the invention. In the figures, the reference numeral 1 denotes a speed controller, 2 denotes a q-axis current controller, 3 denotes a noninterference controller, 4 denotes a d-axis current controller, 5 denotes a voltage amplitude and phase calculator, 6 denotes a PWM controller, 6-1 denotes a three-phase voltage command calculator, 6-2 denotes a comparator, 6-3 denotes a phase shifter, 6-4 denotes a carrier signal generator, 7 denotes an inverter main circuit, 8 denotes an AC motor, 9 denotes a stationary coordinate converter, 10 denotes a rotating coordinate converter, 11 denotes a band-pass filter, 12 denotes a pole position detector, 13 denotes a speed calculator, 14 denotes a coordinate converter, 15 denotes an absolute value calculator, 16 denotes a low-pass filter, and 17 denotes a pole position calculator.

When, as shown in FIG. 1(a), a two-phase stationary coordinate system in which the U-phase of the three phases of the motor is $\alpha$-axis and an axis intersecting the axis at 90 deg. is $\beta$-axis is set, and a two-phase stationary coordinate system in which an axis that is shifted by 45 deg. from the $\alpha$-axis is $\alpha'$-axis and an axis intersecting the axis at 90 deg. is $\beta'$-axis is set, inductances in the axes are indicated as expressions (11) to (14) below.

The inductance in the $\alpha$-axis is:

$$L_\alpha(\theta) = L_0 - L_1 \cos(2\theta) \quad (11)$$

In the expressions, $\theta$, $\theta'$, $\theta''$, and $\theta'''$ are variables of the phase in which the respective $\alpha$-, $\beta$-, $\alpha'$-, and $\beta'$-axes are zero deg.

Figure 1B:
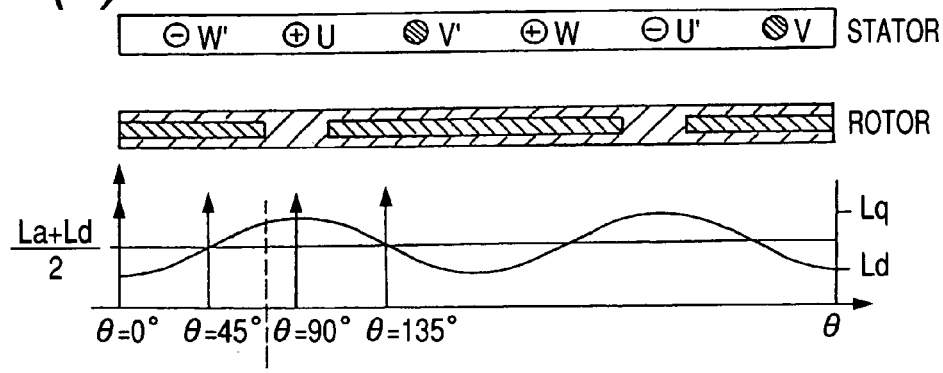

This state is shown in FIG. 1(b) indicating that the magnetic pole position coincides with the $\alpha$-axis.

Figure 1C:
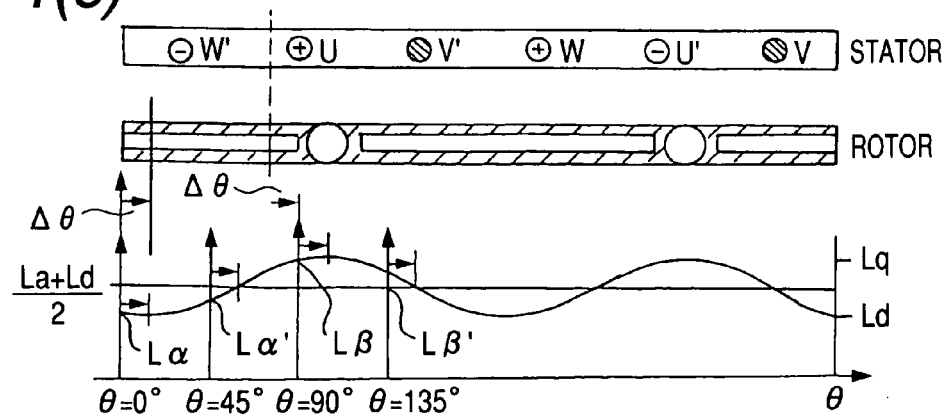

Assuming that the phase is advanced so that the magnetic pole position is shifted from the $\alpha$-axis by $\Delta\theta$ FIG. 1(c), the inductance in the $\alpha$-axis is:

$$L_\alpha = L_0 - L_1 \cos(-2\Delta\theta) = L_0 - L_1 \cos(2\Delta\theta), \quad (15)$$

the inductance in the $\beta$-axis is:

$$L_\beta = L_0 + L_1 \cos(-2\Delta\theta) = L_0 + L_1 \cos(2\Delta\theta), \quad (16)$$

the inductance in the $\alpha'$-axis is:

$$L_{\alpha'} = L_0 + L_1 \sin(-2\Delta\theta) = L_0 - L_1 \sin(2\Delta\theta), \quad (17)$$

the inductance in the $\beta'$-axis is:

$$L_{\beta'} = L_0 - L_1 \sin(-2\Delta\theta) = L_0 + L_1 \sin(2\Delta\theta), \quad (18)$$

Expression (16) is subtracted from expression (15) to extract only the magnetic pole position information as follow:

$$L_\alpha - L_\beta = -L_1 \cos(2\Delta\theta) \quad (19)$$

Similarly, expression (18) is subtracted from expression (17) to obtain the following:

$$L_{\alpha'} - L_{\beta'} = -L_1 \sin(2\Delta\theta) \quad (20)$$

The magnetic pole position can be detected by following expression (21):

$$\tan(2\Delta\theta) = \frac{L_{\alpha'} - L_{\beta'}}{L_\alpha - L_\beta} \quad (21)$$

Hereinafter, the calculations of the inductances will be specifically described.

In expressions (8) to (10), $\theta = \Delta\theta$ is set. When the resulting expressions are substituted to expressions (15) to (18), the following are obtained:

$$L_\alpha = (L_0^2 - L_1^2) \cdot \frac{i_{\alpha h}}{u_{\alpha h} \cdot \Delta t} \quad (22)$$

$$L_\beta = -(L_0^2 - L_1^2) \cdot \frac{i_{\beta h}}{u_{\beta h} \cdot \Delta t} \quad (23)$$

$$L_{\alpha'} = (L_0^2 - L_1^2) \cdot \frac{i_{\alpha' h}}{u_{\alpha' h} \cdot \Delta t} \quad (24)$$

$$L_{\beta'} = -(L_0^2 - L_1^2) \cdot \frac{i_{\beta' h}}{u_{\beta' h} \cdot \Delta t} \quad (25)$$

where
$i\alpha'_h = (i\alpha_h + i\beta_h)|\theta = 45°$,
$i\beta'_h = (i\alpha_h + i\beta_h)|\theta = 135°$,
$u\alpha'_h = (u\alpha_h + u\beta_h)|\theta = 45°$, and
$u\beta'_h = (u\alpha_h + u\beta_h)|\theta = 135°$.

When the voltage in the carrier period is dealt as a fixed value, the inductances can be calculated by using only the carrier frequency component currents which are converted to the coordinates, respectively. Namely, the followings are obtained:

$$L_\alpha \propto |i_{\alpha h}|_{av} \quad (26)$$

$$L_\beta \propto |i_{\beta h}|_{av} \quad (27)$$

$$L_{\alpha'} \propto |i_{\alpha' h}|_{av} \quad (28)$$

$$L_{\beta'} \propto |i_{\beta' h}|_{av} \quad (29)$$

where | |α$_v$ indicates averaging of an absolute value. Therefore, expression (21) is reduced to:

$$\tan(2\Delta\theta) = \frac{||i_{\alpha'h}|_{av} - |i_{\beta'h}|_{av}|}{||i_{\alpha h}|_{av} - |i_{\beta h}|_{av}|} \quad (30)$$

As a result, the problem that a practical use is hardly attained in a conventional art can be solved by, in place of calculating instantaneous values of carrier currents, fetching only peak values and averaging them.

Hereinafter, an embodiment of the invention will be described with reference to the drawings.

Figure 2:
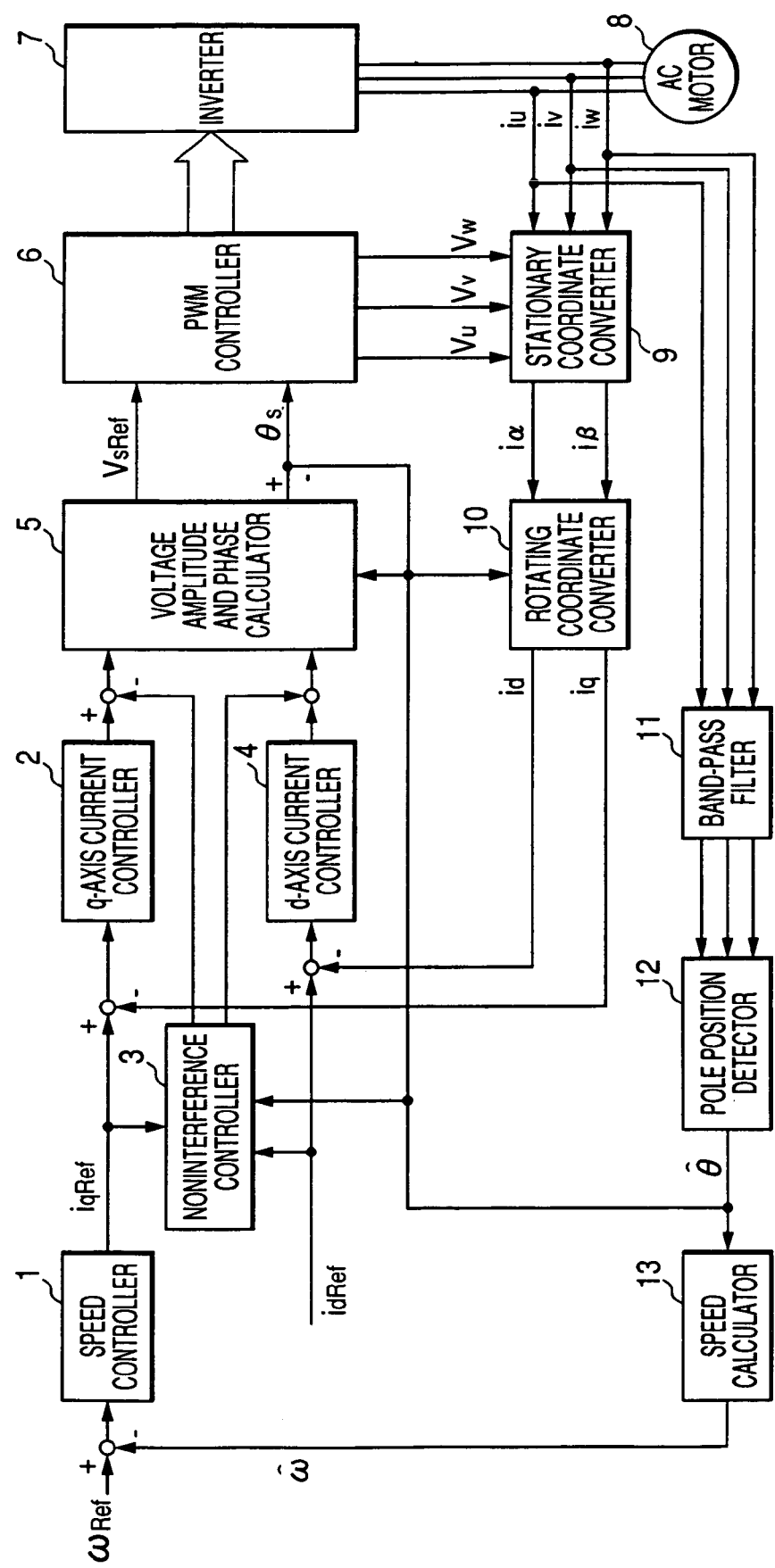
FIG. 2 is a control block diagram of an apparatus for detecting a magnetic pole position of a motor shown in FIG. 1.

Referring to FIG. 2, a speed controller 1 compares a speed command value with a speed estimate value, and determines a q-axis current (torque current) command iqRef so that the deviation in the comparison becomes zero. A q-axis current controller 2 compares iqRef with a current iq which is a current proportional to the torque among currents that are converted to a coordinate system 10 (a d-q coordinate converter) rotating in synchronization with the rotor, and determines a voltage command Vq so that the deviation in the comparison becomes zero.

A d-axis current controller 4 compares idRef with a current id which is a current related to the magnetic pole direction among currents that are converted to the coordinate system rotating in synchronization with the rotor, and determines a voltage command Vd so that the deviation in the comparison becomes zero. A noninterference controller 3 calculates speed electromotive forces which interfere with each other between the d- and q-axes, and controls them so as to cancel influences on the current controllers. A voltage amplitude and phase calculator 5 receives the voltage commands Vd, Vq, and calculates the amplitude and phase of a command voltage vector. A PWM controller 6 receives the amplitude and phase of the command voltage vector calculated by the voltage amplitude and phase calculator 5, and generates an inverter switching signal. The reference numeral 7 denotes an inverter main circuit which three-phase drives an AC motor 8 by the switching signal. (The above is a vector controlling portion for a usual AC motor.)

In FIG. 2, the portion constituting the apparatus for detecting a magnetic pole position of the invention includes: a circuit which generates and outputs a high frequency for detecting a magnetic pole position, on the basis of the carrier signal of the PWM controller 6; a portion which converts three-phase high-frequency currents by a stationary coordinate converter 9 (an α-β coordinate converter), and then converts to the rotating coordinate system (d-q) 10; and a portion which receives the three-phase high-frequency currents via a BPF 11, estimates θ by a pole position detector 12, performs detection of a magnetic pole position to use it as a control reference, and performs speed estimation by a speed calculator 13.

Figure 3:
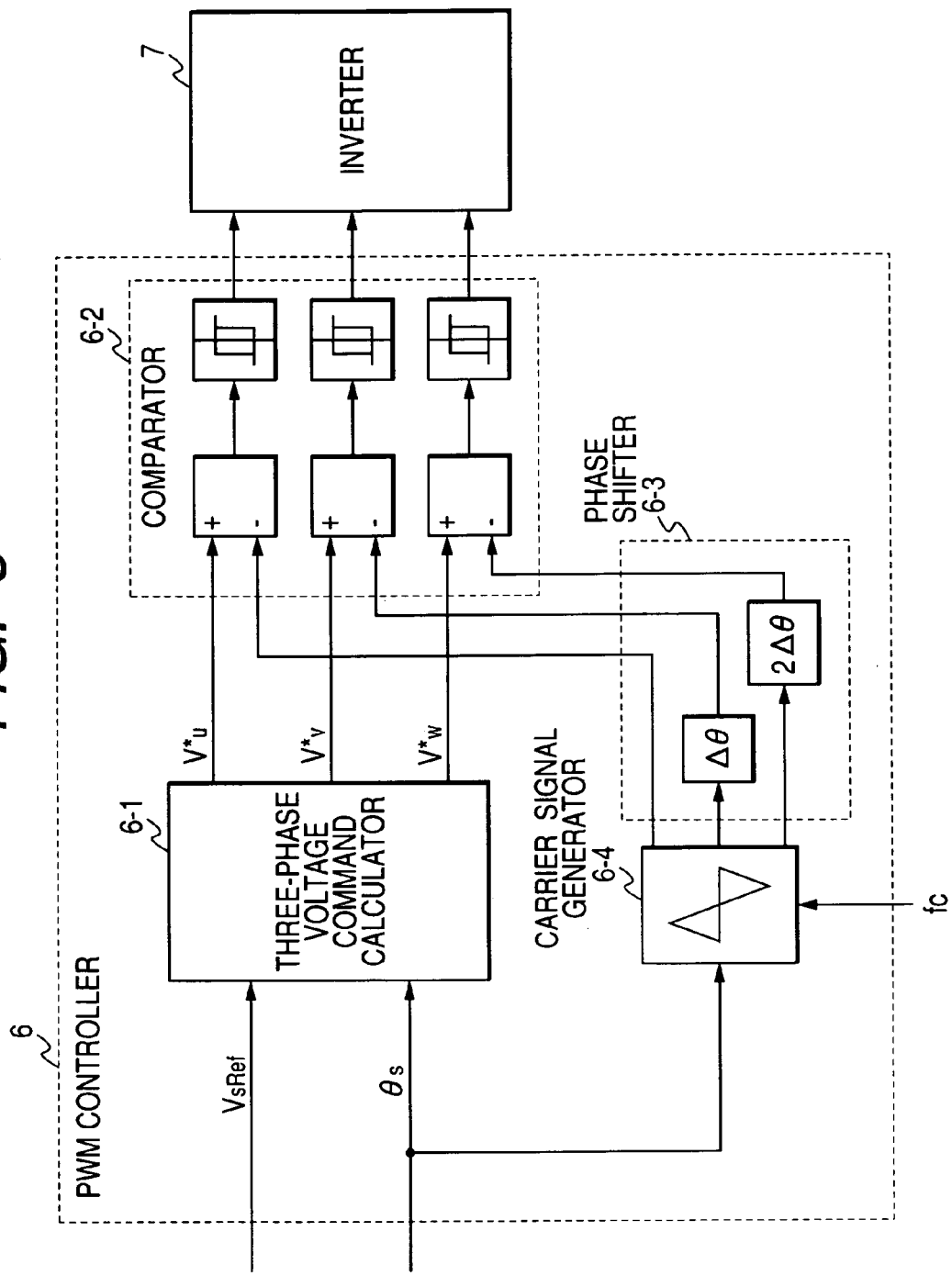
FIG. 3 is a block diagram of a PWM controller shown in FIG. 2.

Referring to FIG. 3, FIG. 3 is a detail view of the PWM controller 6 which generates an arbitrary high frequency. A three-phase voltage command calculator 6-1 receives the amplitude and phase angle of the voltage command vector which is calculated by the usual vector controlling apparatus, and calculates voltage command values of three phases.

By contrast, in order to generate high frequencies which are different from a driving frequency, in carrier signals having an arbitrary frequency generated by a carrier signal generator 6-4, a phase shifter 6-3 shifts the phase of the V-phase by an angle Δθ with respect to the U-phase, and shifts the W-phase by 2Δθ, and a comparator 6-2 compares the signals with the voltage command values and generates switching signals. The switching signals are input to the inverter main circuit denoted by 7. (The detection of a magnetic pole position is performed by using the high frequencies.)

Figure 4:
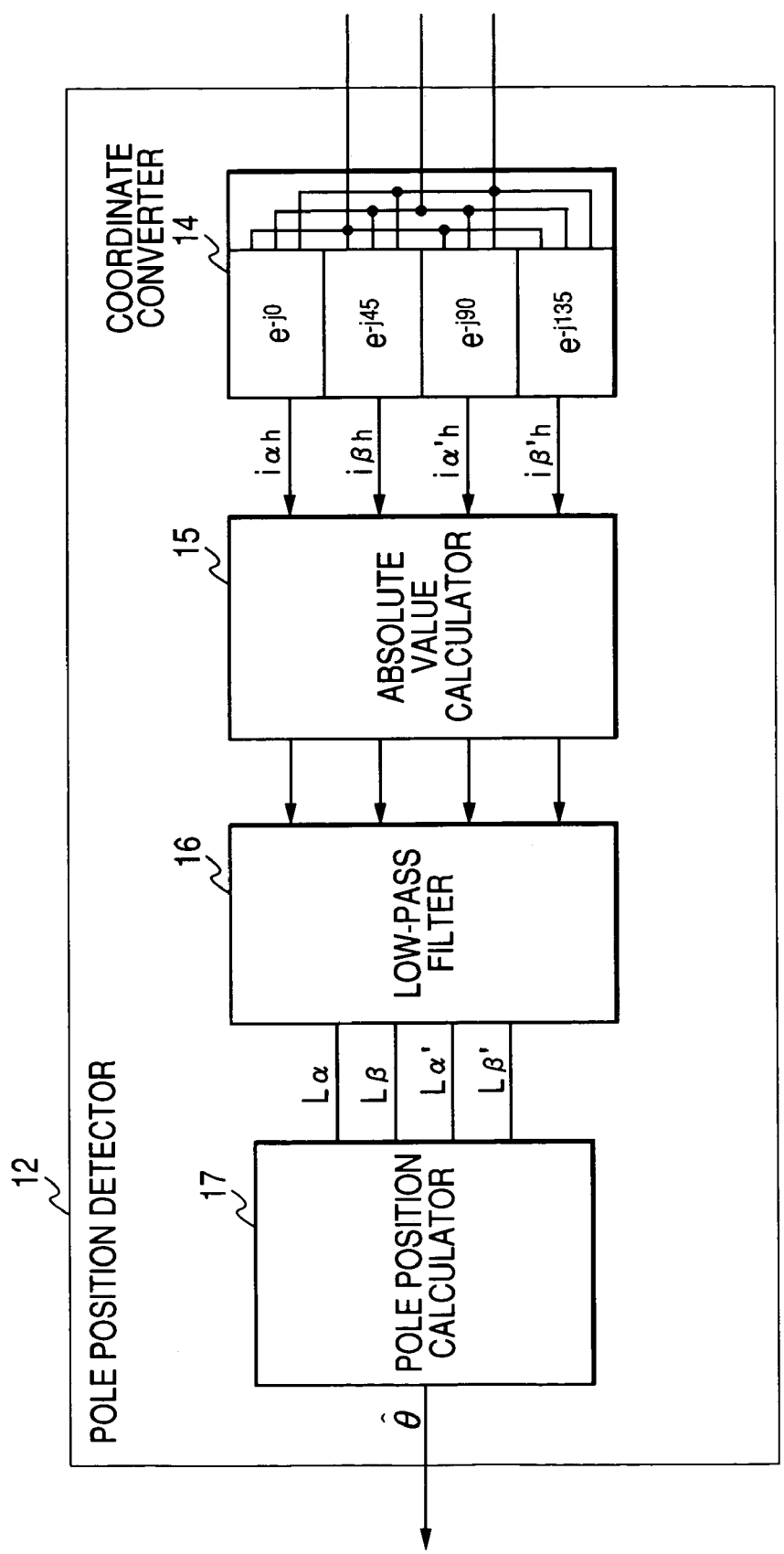
FIG. 4 is a diagram showing the configuration of a pole position detector shown in FIG. 2.

Referring to FIG. 4, FIG. 4 is a diagram showing in detail the configuration of the pole position detector 12 shown in FIG. 2. The three-phase high-frequency currents from the BPF 11 shown in FIG. 2 are converted by a coordinate converter 14 to the α-axis, the β-axis, the α'-axis, and the β'-axis, peak values of the converted currents are fetched, an averaging process is performed by an absolute value calculator 15 and a low-pass filter 16, and θ is estimated by a pole position calculator 17.

Next, the operation will be described.

First, as shown in FIG. 3, in the carrier signals generated by the carrier signal generator 6-4, the phase shifter 6-3 shifts the phase of the V-phase by an angle Δθ with respect to the U-phase, and shifts the W-phase by 2Δθ to output the high frequencies uuh, uvh, and uwh for detecting a magnetic pole position such as shown in expression (1).

In the estimation of a magnetic pole position, first, the stationary coordinate converter 9 extracts only an arbitrary frequency designated in the band-pass filter 11, with respect to a detected voltage or a command voltage and a detected current.

In the pole position detector 12 shown in FIG. 4, the three-phase high-frequency currents i output from the band-pass filter 11 are converted by the coordinate converter 14 to the α-axis, the β-axis, the α'-axis, and the β'-axis. Then, the absolute value calculator 15 implements a process of averaging peak values of the outputs (iα$_h$, iβ$_h$, iα'$_h$, iβ'$_h$) of the coordinate converter 14. The low-pass filter 16 has an effect of more smoothing the outputs of the absolute value calculator 15. In the case where the number of samples of the peak values in the absolutizing process is large, the low-pass filter may be omitted. The outputs |iα$_h$|α$_v$, |iβ$_h$|α$_v$, |iα'$_h$|α$_v$, and |iβ'$_h$|α$_v$ of the low-pass filter 16 are proportional to the inductances of the axes as shown in expressions (26) to (29) above. The subsequent pole position calculator 17 calculates the magnetic pole position from Δθ which is obtained by implementing the calculation of expression (30), and outputs the position. Therefore, a magnetic pole position can be easily detected only from current values without calculating inductances. Furthermore, it has been ascertained that, even when the timing of current sampling is deviated by an addition of the averaging process, an error due to the deviation scarcely occurs.

When the magnetic pole position is detected as described above, the speed estimate value ω is estimated by the speed calculator 13, a deviation with respect to ωref is adjusted by the speed controller 1, and a q-axis current component iqref is output. The q-axis current controller 2 outputs the voltage command Vq which is a result of comparison between iqref with the current iq that is obtained by converting the three-phase high-frequency current to the α-β axes in the stationary coordinate converter 9, converting a result of the conversion with respect to the d-axis by the d-q axis converter 10, and performing a vector control synchronized with the high-frequency currents. The value of θ is adjusted. As a result, a motor control on the basis of the detected magnetic pole position can be implemented.

While the invention has been described in detail with reference to a specific embodiment, it will be understood by those skilled in the art that various changes and modifications can be made without departing from the spirit and scope of the invention.

As described above, according to the invention, inductances on four coordinate axes can be calculated by using only carrier frequency component currents which are converted to the coordinates, respectively, and calculations are conducted by using an average value obtained by fetching only peak values, in place of instantaneous values of the carrier frequency component currents, thereby attaining an effect that it is possible to easily solve the problem that a practical use is hardly attained in a conventional art because of complicated synchronization between the current detection timing and the position calculation.

The invention claimed is:

1. A method of detecting a magnetic pole position of a motor having electric saliency, said method comprising:
generating an arbitrary high frequency in input voltages or input currents of the motor by means for producing an arbitrary phase difference between a U-phase, a V-phase, and a W-phase, in said inverter, wherein said arbitrary high frequency is not equal to an output frequency of a voltage source PWM inverter,
converting said input voltages or said input currents to a first two-phase stationary coordinate system in which a U-phase of three phases of said motor is α-axis and an axis intersecting said α-axis at 90 deg. is β-axis, to generate first converted signals,
detecting a first current and a second current in respective said α- and β-axes, from the first converted signals,
converting said input voltages or said input currents to a second two-phase stationary coordinate system shifted by about 45 deg. from said first two-phase stationary coordinate system, axes of the second two-phase coordinate system being α'-axis and β'-axis, to generate second converted signals,
detecting a third current and a fourth current in each of said α'- and β'-axes, from the second converted signals, and
detecting a magnetic pole position of said motor by using said first, second, third, and fourth currents.

2. The method of detecting a magnetic pole position of a motor according to claim 1, wherein said magnetic pole position of said motor is detected by using an output which is obtained by extracting peak currents from said first, second, third, and fourth currents that are detected respectively in said four axes, and then passing said peak currents through a low-pass filter.

3. An apparatus for detecting a magnetic pole position for a motor driven by a voltage source PWM inverter, said apparatus comprising:
means for producing an arbitrary phase difference in PWM carrier signals between a U-phase, a V-phase, and a W-phase;
means for generating and extracting only high-frequency currents; and
means for detecting a magnetic pole position by using said extracted high frequency currents,
wherein said means for detecting said magnetic pole position detects said magnetic pole position by:
generating an arbitrary high frequency in input voltages or input currents of the motor by the means for producing the arbitrary phase difference between the U-phase, the V-phase, and the W-phase, wherein said arbitrary high frequency is not equal to an output frequency of the voltage source PWM inverter,
converting said input voltages or said input currents to a first two-phase stationary coordinate system in which a U-phase of three phases of said motor is α-axis and an axis intersecting said α-axis at 90 deg. is β-axis, to generate first converted signals,
detecting a first current and a second current in respective said α- and β-axes, from the first converted signals,
converting said input voltages or said input currents to a second two-phase stationary coordinate system shifted by about 45 deg. from said first two-phase stationary coordinate system, axes of the second two-phase coordinate system being α'-axis and β'-axis, to generate second converted signals,
detecting a third current and a fourth current in each of said α'- and β'-axes, from the second converted signals, and
detecting said magnetic pole position of said motor by using said first, second, third, and fourth currents.

4. An apparatus for detecting a magnetic pole position for a motor driven by a voltage source PWM inverter, said apparatus comprising:
means for producing an arbitrary phase difference in PWM carrier signals between a U-phase, a V-phase, and a W-phase;
means for generating and extracting only high-frequency currents; and
means for detecting a magnetic pole position by using said extracted high frequency currents,
wherein said means for detecting said magnetic pole position detects said magnetic pole position by:
generating an arbitrary high frequency in input voltages or input currents of the motor by means for producing the arbitrary phase difference between the U-phase, the V-phase, and the W-phase, wherein said arbitrary high frequency is not equal to an output frequency of the voltage source PWM inverter,
converting said input voltages or said input currents to a first two-phase stationary coordinate system in which a U-phase of three phases of said motor is α-axis and an axis intersecting said α-axis at 90 deg. is β-axis, to generate first converted signals,
detecting a first current and a second current in respective said α- and β-axes, from the first converted signals,
converting said input voltages or said input currents to a second two-phase stationary coordinate system shifted by about 45 deg. from said first two-phase stationary coordinate system, axes of the second two-phase coordinate system being α'-axis and β'-axis, to generate second converted signals,
detecting a third current and a fourth current in each of said α'- and β'-axes, from the second converted signals,
detecting said magnetic pole position of said motor by using said first, second, third, and fourth currents, and
wherein said magnetic pole position of said motor is detected by using an output which is obtained by extracting peak currents from said first, second, third, and fourth currents that are detected respectively in said four axes, and then passing said peak currents through a low-pass filter.

5. The method of detecting a magnetic pole position of a motor according to claim 1, wherein said arbitrary phase difference is 120 deg., and said arbitrary high frequency is an inverter carrier frequency.

6. The method of detecting a magnetic pole position of a motor according to claim 2, wherein said arbitrary phase difference is 120 deg., and said arbitrary high frequency is an inverter carrier frequency.

7. The apparatus for detecting a magnetic pole position for a motor according to any one of claim 3, wherein said arbitrary phase difference is 120 deg., and said arbitrary high frequency is an inverter carrier frequency.

8. An apparatus for controlling a motor wherein said apparatus comprises a current controlling apparatus which splits a detected current into a pole direction component and a torque component by using said position detected by an apparatus for detecting a magnetic pole position, which feedbacks said pole direction and said torque components to compare said pole direction and said torque components with current a command value for said pole direction component and a current command value for said torque component in comparisons, and which implements a current control so that deviations in said comparisons become zero,
  wherein the apparatus for detecting the magnetic pole position for the motor driven by a voltage source PWM inverter comprises:
    means for producing an arbitrary phase difference in PWM carrier signals between a U-phase, a V-phase, and a W-phase;
    means for generating and extracting high-frequency currents from detected voltages or a command voltage and detected currents; and
    means for detecting the magnetic pole position by using said extracted high-frequency currents.

9. An apparatus for controlling a motor wherein said apparatus comprises a speed detecting apparatus which detects a speed by using said position detected by the apparatus for detecting a magnetic pole position according to any one of claims 3 and 8.

10. An apparatus for controlling a motor receiving said position detected by an apparatus for detecting a magnetic pole position, wherein said apparatus for controlling the motor comprises:
  a speed detecting apparatus which detects a speed by using said position; and
  a speed controlling apparatus which compares said speed detected by said speed detecting apparatus with a command speed, which implements a speed control so that a deviation in said comparison becomes zero, and which outputs a torque command value or a current command value corresponding to a torque command,
  wherein the apparatus for detecting the magnetic pole position for the motor driven by a voltage source PWM inverter comprises:
    means for producing an arbitrary phase difference in PWM carrier signals between a U-phase, a V-phase, and a W-phase;
    means for generating and extracting high-frequency currents from detected voltages or a command voltage and detected currents; and
    means for detecting the magnetic pole position by using said extracted high-frequency currents.

11. An apparatus for controlling a motor wherein said apparatus comprises a position controlling apparatus which compares said magnetic pole position detected on the basis of an apparatus for detecting a magnetic pole position, with a command position, which implements a position control so that a deviation in said comparison becomes zero, and which outputs a speed command value,
  wherein the apparatus for detecting the magnetic pole position for the motor driven by a voltage source PWM inverter comprises:
    means for producing an arbitrary phase difference in PWM carrier signals between a U-phase, a V-phase, and a W-phase;
    means for generating and extracting high-frequency currents from detected voltages or a command voltage and detected currents; and
    means for detecting the magnetic pole position by using said extracted high-frequency currents.

12. An apparatus for controlling a motor wherein said apparatus comprises a torque controlling apparatus having the apparatus for detecting a magnetic pole position for a motor driven by a voltage source PWM inverter, said apparatus for detecting the magnetic pole position comprising:
    means for producing an arbitrary phase difference in PWM carrier signals between a U-phase, a V-phase, and a W-phase;
    means for generating and extracting only high-frequency currents; and
    means for detecting a magnetic pole position by using said extracted high frequency currents,
    wherein said arbitrary phase difference is 120 deg., and said arbitrary high frequency is an inverter carrier frequency,
    said means for detecting said magnetic pole position detects said magnetic pole position by:
    generating an arbitrary high frequency in input voltages or input currents of the motor by the means for producing the arbitrary phase difference between the U-phase, the V-phase, and the W-phase, wherein said arbitrary high frequency is not equal to an output frequency of the voltage source PWM inverter,
    converting said input voltages or said input currents to a first two-phase stationary coordinate system in which a U-phase of three phases of said motor is α-axis and an axis intersecting said α-axis at 90 deg. is β-axis, to generate first converted signals,
    detecting a first current and a second current in respective said α- and β-axes, from the first converted signals,
    converting said input voltages or said input currents to a second two-phase stationary coordinate system shifted by about 45 deg. from said first two-phase stationary coordinate system, axes of the second two-phase coordinate system being α'-axis and β'-axis, to generate second converted signals,
    detecting a third current and a fourth current in each of said α'- and β'-axes, from the second converted signals, and
    detecting said magnetic pole position of said motor by using said first, second, third, and fourth currents.

13. An apparatus for controlling a motor wherein said apparatus comprises a speed controlling apparatus having the apparatus for detecting a magnetic pole position for a motor driven by a voltage source PWM inventor, said apparatus for detecting the magnetic pole position comprising:
    means for producing an arbitrary phase difference in PWM carrier signals between a U-phase, a V-phase, and a W-phase;
    means for generating and extracting only high-frequency currents; and
    means for detecting a magnetic pole position by using said extracted high frequency currents,
    wherein said arbitrary phase difference is 120 deg., and said arbitrary high frequency is an inverter carrier frequency,
    said means for detecting said magnetic pole position detects said magnetic pole position by:
    generating an arbitrary high frequency in input voltages or input currents of the motor by the means for producing the arbitrary phase difference between the U-phase, the V-phase, and the W-phase, wherein said arbitrary high frequency is not equal to an output frequency of the voltage source PWM inverter, converting said input voltages or said input currents to a first two-phase stationary coordinate system in which a U-phase of three phases of said motor is α-axis and an axis intersecting said α-axis at 90 deg. is β-axis, to generate first converted signals, detecting a first current and a second current in respective said α- and β-axes, from the first converted signals, converting said input voltages or said input currents to a second two-phase stationary coordinate system shifted by about 45 deg. from said first two-phase stationary coordinate system, axes of the second two-phase coordinate system being α'-axis and β'-axis, to generate second converted signals, detecting a third current and a fourth current in each of said α'- and β'-axes, from the second converted signals, and detecting said magnetic pole position of said motor by using said first, second, third, and fourth currents.

14. An apparatus for controlling a motor wherein said apparatus comprises position controlling apparatus having the apparatus for detecting a magnetic pole position for a motor driven by a voltage source PWM inverter, said apparatus for detecting the magnetic pole position comprising:

means for producing an arbitrary phase difference in PWM carrier signals between a U-phase, a V-phase, and a W-phase;

means for generating and extracting only high-frequency currents; and means for detecting a magnetic pole position by using said extracted high frequency currents, wherein said arbitrary phase difference is 120 deg., and said arbitrary high frequency is an inverter carrier frequency, said means for detecting said magnetic pole position detects said magnetic pole position by:

generating an arbitrary high frequency in input voltages or input currents of the motor by the means for producing the arbitrary phase difference between the U-phase, the V-phase, and the W-phase, wherein said arbitrary high frequency is not equal to an output frequency of the voltage source PWM inverter, converting said input voltages or said input currents to a first two-phase stationary coordinate system in which a U-phase of three phases of said motor is α-axis and an axis intersecting said α-axis at 90 deg. is β-axis, to generate first converted signals, detecting a first current and a second current in respective said α- and β-axes, from the first converted signals, converting said input voltages or said input currents to a second two-phase stationary coordinate system shifted by about 45 deg. from said first two-phase stationary coordinate system, axes of the second two-phase coordinate system being α'-axis and β'-axes, to generate second converted signals, detecting a third current and a fourth current in each of said α'- and β'-axes, from the second converted signals, and detecting said magnetic pole position of said motor by using said first, second, third, and fourth currents.

15. An apparatus for controlling a motor wherein said apparatus comprises a speed detecting apparatus which detects a speed by using said position detected by the apparatus for detecting a magnetic pole position for a motor driven by a voltage source PWM inverter, said apparatus comprising:

means for producing an arbitrary phase difference in PWM carrier signals between a U-phase, a V-phase, and a W-phase;

means for generating and extracting high-frequency currents from detected voltages or a command voltage and detected currents;

means for detecting a magnetic pole position by using said extracted high-frequency currents; and a speed controlling apparatus comparing said speed detected by said speed detecting apparatus with a command speed in a comparison, said speed controlling apparatus implementing a speed control so that a deviation in said comparison becomes zero, and outputting a torque command value or a current command value corresponding to a torque command.

16. An apparatus for controlling a motor wherein said apparatus comprises a current controlling apparatus which splits a detected current into a pole direction component and a torque component by using said position detected by an apparatus for detecting a magnetic pole position, which feedbacks said pole direction and said torque components to compare said pole direction and said torque components with current a command value for said pole direction component and a current command value for said torque component in comparisons, and which implements a current control so that deviations in said comparisons become zero, wherein the apparatus for detecting the magnetic pole position for the motor driven by a voltage source PWM inverter comprises:

means for producing an arbitrary phase difference in PWM carrier signals between a U-phase, a V-phase, and a W-phase;

means for generating and extracting only high-frequency currents; and means for detecting a magnetic pole position by using said extracted high-frequency currents.

17. An apparatus for controlling a motor receiving said position detected by an apparatus for detecting a magnetic pole position, wherein said apparatus for controlling the motor comprises:

a speed detecting apparatus which detects a speed by using said position; and a speed controlling apparatus which compares said speed detected by said speed detecting apparatus with a command speed, which implements a speed control so that a deviation in said comparison becomes zero, and which outputs a torque command value or a current command value corresponding to a torque command, wherein the apparatus for detecting the magnetic pole position for the motor driven by a voltage source PWM inverter comprises:

means for producing an arbitrary phase difference in PWM carrier signals between a U-phase, a V-phase, and a W-phase;

means for generating and extracting only high-frequency currents; and means for detecting a magnetic pole position by using said extracted high-frequency currents.

18. An apparatus for controlling a motor wherein said apparatus comprises a position controlling apparatus which compares said magnetic pole position detected on the basis of an apparatus for detecting a magnetic pole position, with a command position, which implements a position control so that a deviation in said comparison becomes zero, and which outputs a speed command value, wherein the apparatus for detecting the magnetic pole position for the motor driven by a voltage source PWM inverter comprises:
means for producing an arbitrary phase difference in PWM carrier signals between a U-phase, a V-phase, and a W-phase;
means for generating and extracting only high-frequency currents; and
means for detecting a magnetic pole position by using said extracted high-frequency currents.

19. An apparatus for controlling a motor wherein said apparatus comprises a speed detecting apparatus which detects a speed by using said position detected by the apparatus for detecting a magnetic pole position for a motor driven by a voltage source PWM inverter, said apparatus comprising:

means for producing an arbitrary phase difference in PWM carrier signals between a U-phase, a V-phase, and a W-phase;
means for generating and extracting only high-frequency currents;
means for detecting a magnetic pole position by using said extracted high-frequency currents, and
a speed controlling apparatus comparing said speed detected by said speed detecting apparatus with a command speed in a comparison, said speed controlling apparatus implementing a speed control so that a deviation in said comparison becomes zero, and outputting a torque command valve or a current command value corresponding to a torque command.

* * * * *